June 24, 1952
F. T. HAGUE
2,601,390
COMBUSTION CHAMBER FOR GAS TURBINES WITH
CIRCUMFERENTIALLY ARRANGED PULVERIZED
SOLID FUEL AND AIR NOZZLES
Filed Nov. 7, 1946
3 Sheets-Sheet 1
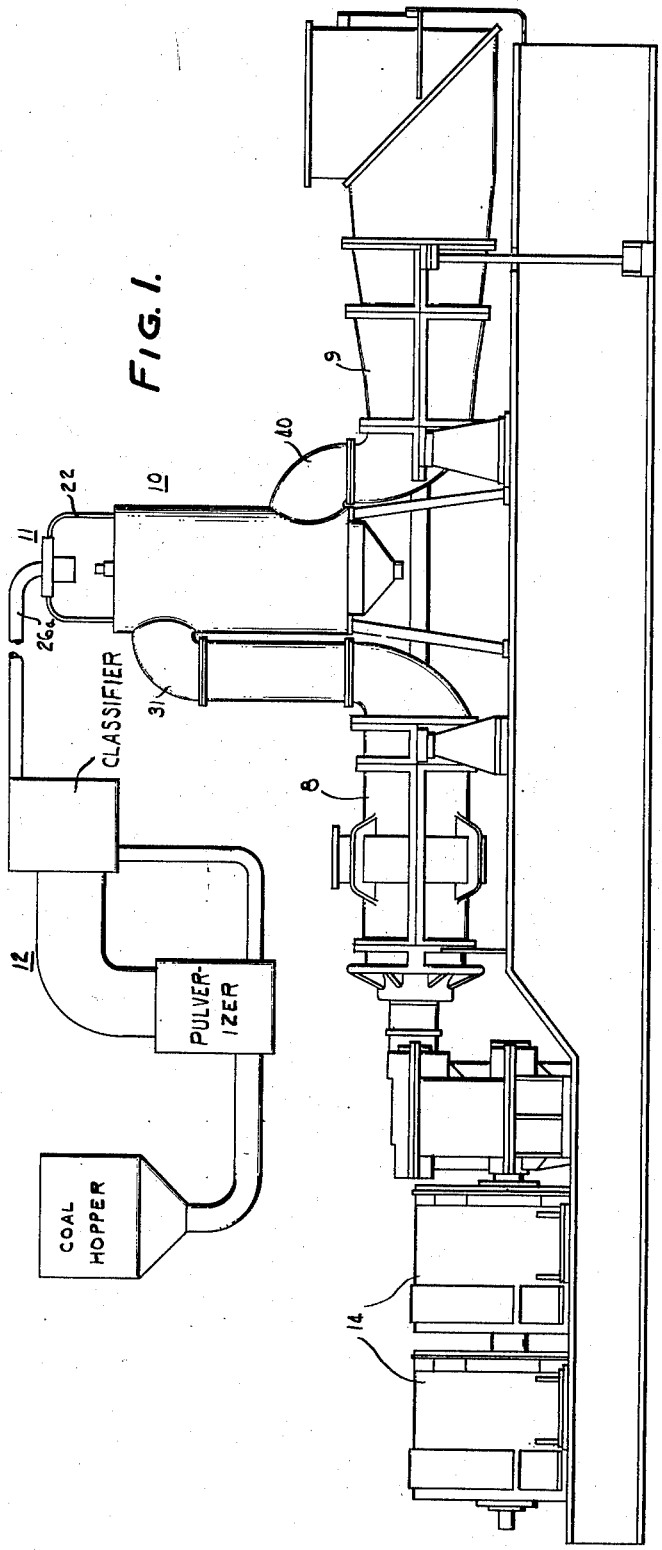
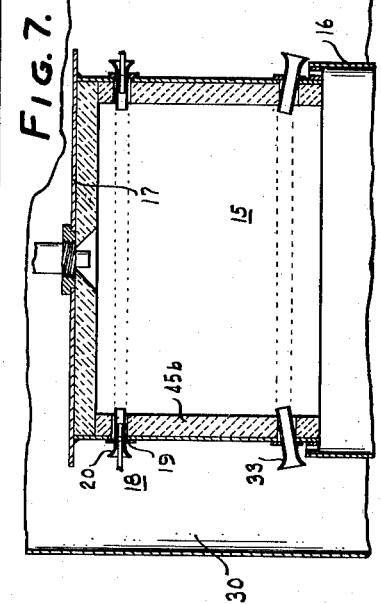
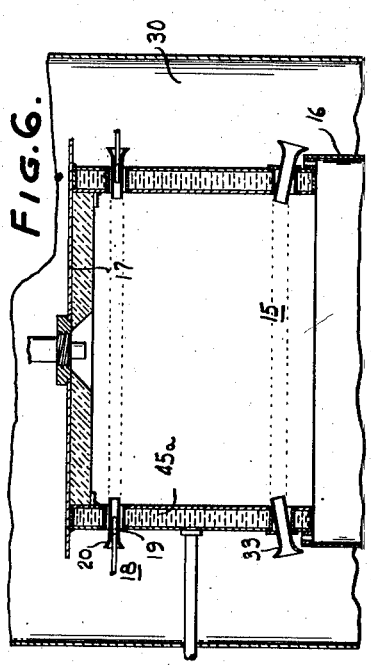
INVENTOR
FLOYD T. HAGUE
BY
ATTORNEY

INVENTOR
FLOYD T. HAGUE

INVENTOR
FLOYD T. HAGUE

Patented June 24, 1952

2,601,390

UNITED STATES PATENT OFFICE 2,601,390

COMBUSTION CHAMBER FOR GAS TURBINES WITH CIRCUMFERENTIALLY ARRANGED PULVERIZED SOLID FUEL AND AIR NOZZLES

Floyd T. Hague, Drexel Hill, Pa., assignor to Westinghouse Electric Corporation, East Pittsburgh, Pa., a corporation of Pennsylvania Application November 7, 1946, Serial No. 708,275

13 Claims. (Cl. 60—39.46)

The invention relates to combustion of pulverized solid fuel and it has for an object to provide a combustor capable of handling solid fuel pulverized fine enough to produce motive fluid for turbine operation and in which the solid non-combustible particles are so fine as to obey the laws of gas flow without precipitation as ash or slag.

A further object of the invention is to supply pulverized solid fuel with sufficient air to an ignition zone of a combustor to burn off the volatile component and support combustion of the non-volatile component to an extent adequate to insure of delivery to a combustion zone of the non-volatile component preheated sufficiently to maintain ignition thereof in the latter zone for complete combustion supported by additional air supplied to such zone.

A further object of the invention is to produce gaseous motive fluid for operation of a gas turbine by the combustion of pulverized fuel and dilution of the products of combustion in three successive stages or zones involving ignition and burning of the volatile component and preheating of the non-volatile component followed by combustion of the latter and then reducing the temperature of the products of combustion, the three stages or zones being determined by the manner in which air is utilized; sufficient air, along with pulverized fuel, being supplied to the first stage or zone for burning off the volatile component and to support combustion of the non-volatile component to the extent required to maintain the non-volatile component delivered to the second stage or zone at least at the ignition temperature of such component, sufficient air being supplied to the second stage or zone to complete combustion, and sufficient dilution air being supplied to the third stage or zone to render the products of combustion suitable for operation of the turbine.

A gas turbine is ordinarily operated by motive fluid mixture furnished from a combustor supplied with finely divided or atomized fuel and air. While, for the same particle size distribution, there is no essential difference in combustion characteristics of atomized liquid fuel and pulverized coal, it is necessary that coal be heated to a higher temperature for ignition. Pulverized coal may require a temperature of the order of from 1200 to 1400 degrees Fahrenheit, while the temperature required for liquid fuel, such as kerosene, is very much lower. As the volatile component of solid fuel must be burned off before combustion of the non-volatile component takes place and as the ignition temperature has to be maintained for a satisfactory combustion of the non-volatile component, the pulverized fuel is supplied to an ignition zone in which the volatile component is vaporized, ignited and burned and combustion of the non-volatile component takes place sufficiently to maintain ignition in the combustion zone of the non-volatile component supplied to the latter from the ignition zone. Therefore, for pulverized fuel, not only should there be an ignition zone of adequate diameter for intermingling of entering fuel and air, but it should be related to the succeeding combustion zone so that heat from the latter assures of volatilizing, ignition and burning off of the volatile component within a relatively short distance of travel axially of the combustor without such volatile component being carried along and burned with the non-volatile component in the combustion zone, the latter type of combustion resulting in a longer flame and, therefore, requiring a very much longer combustor than where burning of the volatile component is completed in the ignition zone. Also, heat from the combustion zone assures of combustion of the non-volatile component in the ignition zone to the extent required for delivery of the non-volatile component to the combustion zone at least at its ignition temperature. To provide motive fluid of a temperature suitable for the turbine, the high temperature of the gaseous combustion products and excess air are delivered from the combustion zone to a quenching zone where they are diluted with further air. To achieve all of these purposes, I provide a combustor with three regions of air admission spaced apart in a downstream direction and with pulverized fuel supplied to the first region of air admission at the upstream end of the combustor, the portion of the combustor upstream from the second region of air admission constituting the ignition zone, the portion between the second and third regions defining a combustion zone, and the portion downstream from the third region providing a cooling or quenching zone.

Air is admitted in such proportions to the regions along the combustor that the volatile component is burned off in the ignition zone and combustion of the non-volatile component takes place to the extent required to maintain the combustion zone at least at the ignition temperature of the non-volatile component, that combustion is completed in the combustion zone, and that the temperature is reduced sufficiently in the quenching zone. A high rate of heat release and minimum size, particularly length, of the combustor are assured by limiting the excess air and by thorough mixing of the fuel and air so that combustion proceeds at as high a temperature as practicable to reduce the time required therefor and by supplying the fuel and air to the combustor so that the inlet velocities thereof merely serve a mixing purpose and do not contribute to the combustor downstream velocities which are due entirely to volumetric inputs and the prevailing temperatures.

To burn off the volatile component and support combustion of the non-volatile component to the extent indicated, the air admitted to the ignition zone is restricted to from twenty-five to fifty percent of that required for complete combustion; and the air admitted to the second or combustion zone is limited to that required for good combustion with the excess held as low as practicable, for example, from ten to thirty percent, to provide a temperature high enough for rapid combustion; and the air supplied to the quenching zone is restricted to that required for the temperature desired.

Intimate and thorough mixture of fuel and air and of gaseous combustion products and air to secure more uniform and rapid combustion and cooling are provided by admitting the fuel and air through numerous nozzles disposed circumferentially of the combustor. As the ignition zone is open to the combustion zone, heat radiated from the latter into the ignition zone is absorbed by the fuel in the latter and, with heat evolved due to combustion of the volatile component, vaporizes and ignites the volatile component and maintains the ignition temperature in the ignition zone, the air supplied being sufficient for combustion of the volatile component and of the non-volatile component to the extent required for maintenance of ignition in the combustion zone. Aside from admission of the fuel and air to the ignition zone with a tangential component effective to promote admixture, particularly where each fuel nozzle is disposed adjacent to an air nozzle, such admission, coupled with slight tilting of the combustion and quenching zone nozzles upstream, is effective to maintain more uniform flow conditions in the combustor. In addition, where the combustor wall is subject to high temperatures, as with the portion thereof bounding the combustion zone, air is admitted for flow therealong downstream to protect the wall against the effects of overheating.

Accordingly, a further object of the invention is to provide a combustor supplied with pulverized fuel and air and operating, first, to vaporize the volatile component of the fuel, ignite and support complete combustion of such component, and combustion of the non-volatile component to preheat the latter to maintain ignition thereof, next, to supply additional air for combustion of the preheated component, and then to add further air to the hot products of combustion to reduce temperature of the mixture to that desired for gas turbine operation, with the steps of combustion and temperature reduction, or quenching, each taking place in such manner that the combustor length is minimized.

A further object of the invention is to provide a circumferential group of nozzles for supplying fuel and air substantially radially into the upstream end of the combustor, a second circumferential group of nozzles spaced downstream of the combustor from the first group for supplying air substantially radially into the combustor, and a third circumferential group of nozzles spaced downstream along the combustor from the second group for discharging air substantially radially into the combustor, the portion of the combustor between the first and second groups of nozzles bounding a first zone in which the entering fuel and air mix, the volatile fuel component is completely vaporized and burned, and the non-volatile component is preheated to maintain ignition for complete combustion thereof in a second zone bounded by the portion of the combustor between the second and third nozzles and the portion of the combustor between the latter nozzles and the outlet at the downstream end of the combustor bounding a third zone in which air mixes with the hot products of combustion and excess air coming from the second zone to provide motive fluid mixture of the temperature desired for gas turbine operation.

A further object of the invention is to provide apparatus of the above character wherein the combustor wall has nozzles or passages formed therein for discharging air downstream along the interior surface thereof wherever it is necessary to protect the wall against high temperatures.

A further object of the invention is to provide apparatus of the above character wherein the nozzles of the first group are arranged to discharge fuel and air with a small tangential component of direction to produce slow rotation of the mixture in the combustor.

Another object of the invention is to provide apparatus of the above character wherein the fuel and air nozzles of the first group are, respectively, arranged adjacent or coaxially to promote mixing of the entering fuel and air.

Still another object of the invention is to provide apparatus, as aforesaid, wherein the nozzles for the third or quenching zone include a nozzle directed upstream and serving to produce more uniform temperature conditions throughout transverse sections of the stream approaching the combustor outlet.

A further object of the invention is to provide apparatus of the above character wherein the air nozzles for the second and third zones each include long and short nozzles, with the long nozzles of the second group or those of both the second and third groups directed upstream to a desired small extent.

A further object of the invention is to provide apparatus of the above character wherein at least some of the air nozzles for the second zones are inclined upstream to a small extent to produce a slight counterflow of hot combustion products to aid in the heating required in the fuel admission zone.

The foregoing and other objects are effected by the invention as will be apparent from the following description and claims taken in connection with the accompanying drawings, forming a part of this application, in which:

Fig. 1 is a schematic side elevational view of a plant incorporating the invention;

Figs. 6 and 7 are sectional detail views showing modified ignition zone walls.

Figure 2:
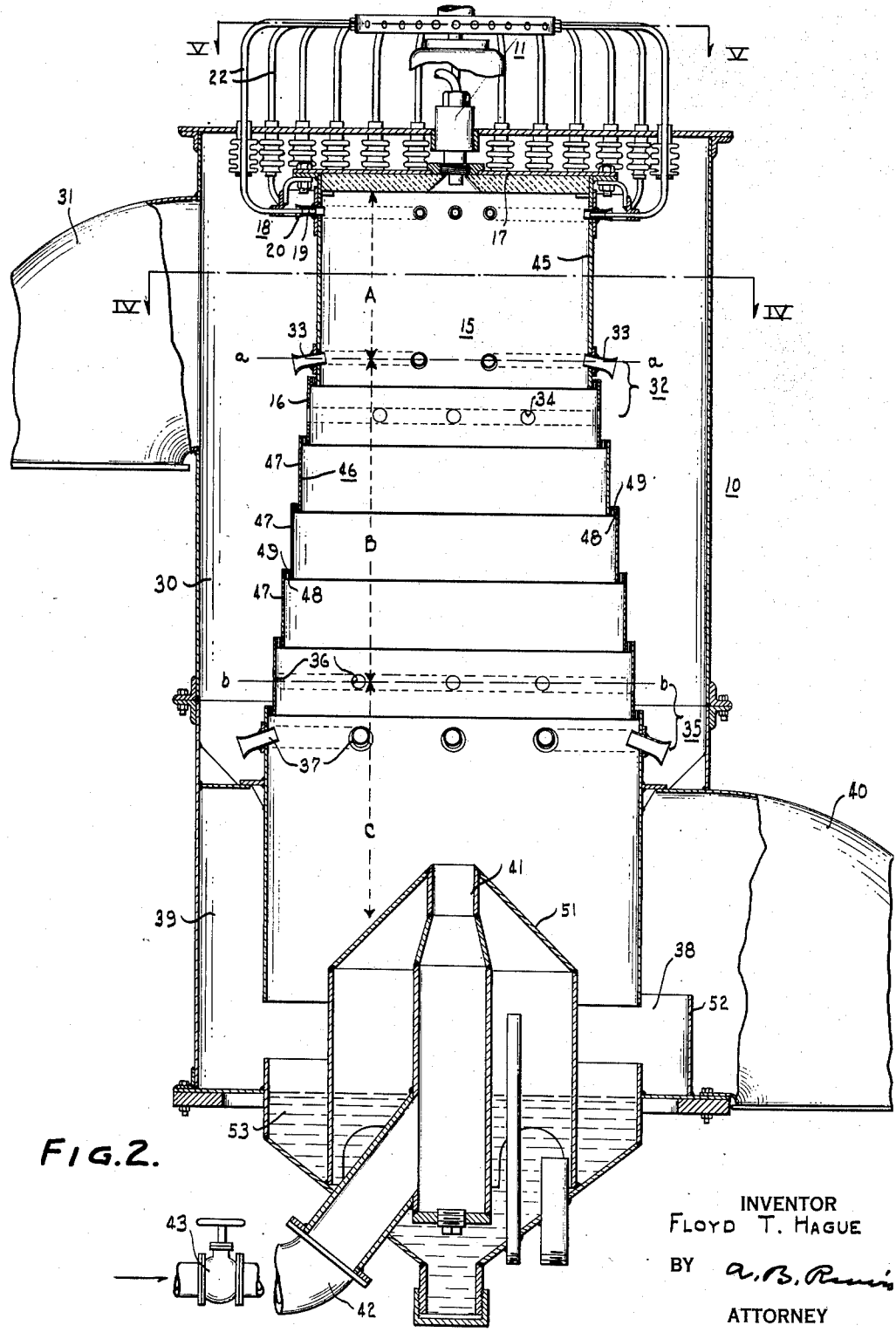
Fig. 2 is a vertical sectional view of the improved gas turbine combustor.
Figure 3:
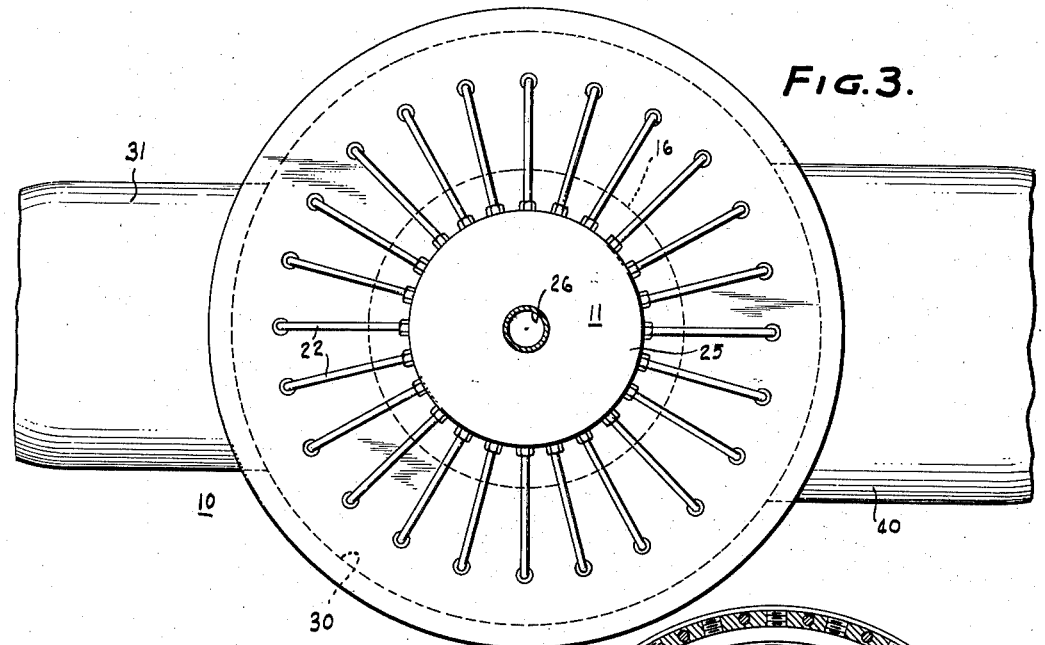
Fig. 3 is a plan view of the apparatus shown in Fig. 2.
Figure 5:
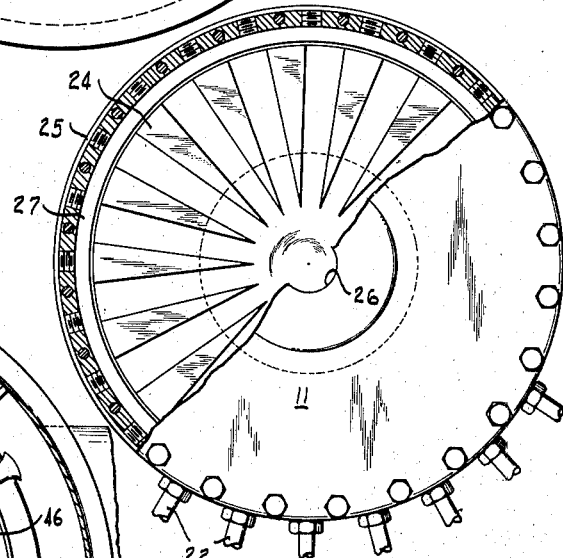
Fig. 5 is an enlarged sectional view taken along the line V—V of Fig. 2 and showing the divider impeller.
Figure 4:
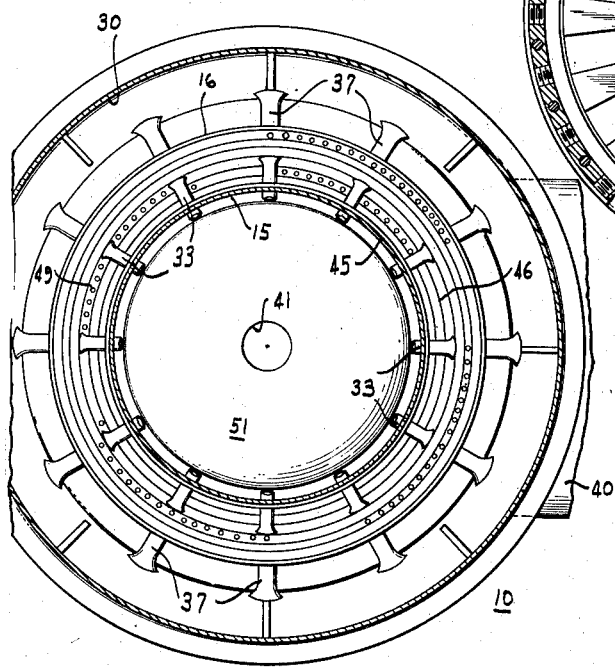
Fig. 4 is a sectional view taken along the line IV—IV of Fig. 2.

In Fig. 1, there is shown a gas turbine plant including a compressor 8 and a gas turbine 9.

A combustor, at 10, is supplied with finely divided solid fuel from the distributor, at 11, and with air from the compressor 8 to effect combustion to provide motive fluid for operation of the turbine. Preferably, the distributor is supplied with fuel in the form of coal-in-air mixture from the pulverizing and classifying apparatus, at 12. The turbine also drives a generator 14 for carrying the external load.

The combustor, at 10, has an elongated combustion chamber 15 bounded by a circumferential wall 16 and an end wall 17 at its upstream end. Finely-divided fuel, preferably pulverized solid fuel or coal, and air are supplied to the combustion chamber by a circumferential group of nozzles, at 18, including a circumferential series of fuel nozzles 19 and a circumferential series of air nozzles 20 disposed respectively adjacent to the fuel nozzles to promote admixture of the entering fuel and air.

As shown, the fuel and air nozzles are coaxial, the inner nozzles 19 supplying coal-in-air mixture and the encompassing nozzles 20 supplying air, sufficient air being admitted with the fuel for a combustion temperature high enough above the ignition point to assure of stability of ignition with complete burning of the vaporized volatile fuel component and preheating of the non-volatile component over a relatively short portion of the length of the combustor, preheating of the non-volatile fuel component serving to maintain ignition of such component undergoing combustion supported by additional air, as hereinafter described.

It is to be understood that any suitable arrangement of fuel and air nozzles may be used so long as the entering fuel and air immediately intermingle or admix at the upstream end of the combustor for vaporization and burning of the volatile fuel component in an initial combustor zone of limited length.

The fuel and air nozzles of the circumferential group, at 18, located at the upstream end of the combustion chamber, that is, near to the end wall 17, are uniformly spaced circumferentially of the combustor wall 16, and extend through the latter and radially inward of the interior surface thereof. Such nozzles are sufficiently numerous to assure of formation of a substantially uniform mixture at the upstream end of the combustor, the contiguous relation of the nozzles, the convergency of the streams issuing therefrom and impact of the streams contributing to immediate mixture with little, if any, downstream motion, particularly as the nozzles are directed substantially radially of the combustor. Uniform mixing of the fuel and air may also be aided by having the nozzles slightly inclined to give the entering media a tangential component for slow rotation in the combustor.

The nozzles 19 for the coal-in-air mixture are supplied by pipes 22 connected to the divider or distributor, at 11, operative to secure substantially uniform distribution of the fuel and air mixture to the uniformly-spaced nozzles 19. While any divider or distributor capable of satisfying the operating requirements may be used, I prefer to use one such as disclosed and claimed in my application Serial No. 714,557, filed December 6, 1946 (now Patent No. 2,474,477 granted June 28, 1949), for the reason that such a distributor or divider assures of a uniform feed and provides for variation in the feed rate by changing the impeller speed.

Briefly, the divider comprises an impeller 24 in the housing 25. The housing has an impeller eye opening 26 supplied with coal-in-air mixture from a suitable source, such as the pulverizing equipment, at 12, by means of conduit 26a. The housing has an annular chamber 27 extending circumferentially about the periphery of the impeller and open to the latter at its inner side. The fuel supply pipes 22 for the fuel nozzles have their inlet ends in communication with the outer side of the annular chamber and such ends are uniformly spaced circumferentially about the latter. The annular chamber functions as an accumulator so that energy derived from the impeller is effective to produce flow through the nozzles in an equalized manner with uniformity of the mixture of coal-in-air supplied to the nozzles. With the inlets of the supply pipes uniformly spaced circumferentially about the annular chamber, with supply pipes of the same flow resistance, and with like nozzles, it is assured that all of the nozzles will be supplied with a uniform mixture and at the same rate.

Air is preferably supplied to the nozzles 20 from the air chamber or jacket 30 encompassing the combustor and having an inlet 31 to which air is supplied by any suitable means, such as the compressor 8.

Downstream from the circumferential group of fuel and air nozzles, at 18, there is provided a second circumferential group of nozzles, at 32, including, for example, the circumferential series of nozzles 33 and 34, for admitting additional air to complete combustion of the fuel; and, further downstream, there are provided third nozzles, at 35, including the circumferential series of nozzles 36 and 37 operative to supply air from the jacket space 30 to cool the gaseous products of combustion suitably for turbine operation before the mixture of gaseous products of combustion and air issue from the combustor outlet opening or openings 38 into the chamber 39 connected to the supply conduit 40 for the turbine 9.

To avoid the tendency to the formation of a central core of combustion products hot enough to damage turbine parts, particularly the nozzles thereof, the third nozzles, at 35, may also include a nozzle 41 located downstream from the nozzles 35 and arranged to discharge a stream of air upstream of the combustor, such air compensating for any inability of the cooling air to penetrate effectively the stream of products of combustion, whereby the stream is more uniformly cooled throughout its flow area and a stream with a high temperature core is avoided.

Proportioning of the air to maintain ignition in the combustion zone and hasten combustion in the latter and to cool the gaseous media to a temperature suitable for turbine operation is secured by providing, in any suitable manner, ignition, combustion and quenching zone nozzle groups and passages having suitable relative flow areas. As shown, the nozzles 20, 33, 34, 36 and 37, as well as the small openings 49, are supplied from the jacket 30 and the nozzle 41 is supplied from the passage 42, both the jacket and the passage being supplied from the compressor. Distribution of air from the packet to the nozzles and passages communicating therewith is secured by choice thereof as to number and size adequate for the relative flows.

With fuel and air supplied to the combustor by the means described, zoned combustion takes place. Vaporization of the volatile fuel component, ignition and burning thereof, and preheating of the non-volatile component occur in the zone A between the end wall 17 and the transverse section of the combustion chamber functionally determined by the nozzles 33 and indicated by the line a—a. The preheated non-volatile component leaving the initial zone A enters the second zone B in which the additional air admitted by the nozzles 33 and 34 is effective to burn such component completely, thereby finishing the combustion process, and radiant heat from the non-volatile fuel component undergoing combustion acts on the fuel in the ignition and volatile component combustion zone A to vaporize and insure ignition and complete combustion of the volatile component. The non-volatile component combustion zone B merges into a third, or cooling, zone indicated at C and whose entrance is fixed by the effect of the cooling air supplied through the third nozzles, at 35.

The ignition, vaporizing and volatile combustion zone A is designed to permit intimate mixing of the in-coming fuel with an amount of in-coming air restricted to that required for complete combustion of the volatile component and preheating of the non-volatile component to maintain ignition of the latter undergoing combustion, supported by air supplied by the nozzles 33 and 34, in the zone B, with a limited lengthwise extent of the zone A, and, at the same time, to develop a combustion temperature in the zone A which is sufficient for these purposes as well as to maintain ignition, with ease of lighting and stability of burning. Experience indicates that air should be from twenty-five to fifty per cent of that required for complete combustion.

The downstream velocity in any part of the ignition zone should not exceed the velocity corresponding to the volume of fuel and air combustion products introduced into it. For this reason, the in-coming fuel and air streams should not have a downstream direction. Not only should the fuel and air enter in such manner and at high velocity to insure rapid mixing, but the fuel velocity must be high enough to secure stable burning and to prevent flashbacks in the fuel supply lines, that is, the incoming fuel velocity must be maintained above the flame propagation velocity of the coal-in-air mixture being used. For a stable "turn-down" range of ten to one, the fuel velocity should be of the order of ten times the flame propagation velocity, or around 12,000 feet per minute at the full load rating.

The foregoing requirements for the initial zone for vaporization, ignition and combustion of the volatile component are met by having the ignition zone at the upstream end of the combustion chamber 15, by having such zone open to receive radiant heat from the combustion zone, and by introducing a controlled ratio of air and fuel through a large number of circumferentially-arranged nozzles, at 18, each of which preferably includes coaxial fuel and air nozzles 19 and 20, arranged to deliver the fuel and air at the velocity required for mixing and stability even at the "turn-down" condition, and, at the same time, to impart no direct downstream velocity to the flow in the ignition zone. This result is effectively accomplished by having the nozzles, at 18, arranged to discharge fuel and air radially inward of the ignition zone and preferably with a small circumferential component of direction so that the mixed stream of fuel and air will slowly rotate in the ignition zone. With these arrangements, carry-over of unconsumed volatile component is guarded against, in consequence of which, not only may the length of the combustor for the ignition zone be kept at a minimum, but excessive overall length is avoided.

While, as illustrated, each nozzle, at 18, comprises coaxial fuel and air nozzles and is therefore an arrangement which operates very effectively to secure uniform mixing of the fuel and air, it is to be understood that other circumferential arrangements of the fuel and air nozzles may be used.

The entrance to the combustion zone B is fixed functionally by the air nozzles 33. The nozzles 33 are provided, for example, by bell-mouthed tubular elements extending through the combustion chamber wall and inwardly of the combustion chamber to a desired extent, while the nozzles 34 are formed by openings provided in the combustion chamber wall. With this arrangement of nozzles for supplying air to the combustion chamber, the air is more uniformly distributed throughout the flow area of the combustion chamber with more effective penetration by the air supplied by the nozzles 33. Preferably, the nozzles 33 are tilted toward the ignition zone to produce a slight counter-flow of hot combustion products to aid in heating the fuel entering such zone.

In a gas turbine combustor, the products of combustion are automatically cooled down to a temperature suitable for gas turbine operation. At the present stage of development of the art, this temperature ranges between 1200 and 1600 degrees Fahrenheit. Therefore, the circumferential group of cooling nozzles 36 and 37 supply air to the combustion chamber to cool the products of combustion. Preferably, each of the nozzles 37 is comprised by a tubular element having a bell mouth to minimize nozzle entrance losses and a uniform diameter for a length about equal to twice the nozzle length. The jets issuing from such nozzle tubes project the cooling air for greatest penetration toward the center of the combustion chamber. The set of nozzles 36 are constituted merely by openings formed in the combustion chamber wall and the jets issuing from such openings mix with the combustion products closer to the combination chamber side walls. The long nozzle jets are desirable in the larger diameter type of combustors, such as are required for burning of pulverized fuel.

Existing types of liquid fuel combustors have shown a strong tendency to form a center core of extremely hot combustion products which damage gas turbine parts, particularly the inlet nozzles thereof. This tendency results from the inability of the cooling jets to penetrate to the center of the combustor and distribute the cooling air properly. To provide against this contingency, the combustor may, if necessary, be equipped with a centrally located upstream-directed nozzle 41 arranged downstream a suitable distance from the cooling air nozzles 36 and 37 and the nozzle 41 may be supplied with approximately twenty-five per cent of the volume of cooling air which is delivered by the cooling nozzles. Preferably, the nozzle 41 is supplied by a passage 42 having a valve or orifice defining means 43 so that the upstream penetration of the cooling air issuing therefrom will extend to the plane in which the radially-directed jets deliver their cooling air. With such orifice means properly set, no further adjustment thereof is required. The air flowing through the central nozzle 41 will provide a blanket of cooling air which will afford some cooling to the hereinafter described metal structure surrounding it.

The circumferential or side wall 45 of the ignition zone or chamber A is shown as an imperforate metallic wall in Fig. 1, inasmuch as metals, for example, high chrome alloys, are available which will successfully withstand temperatures around 1800 degrees F. Therefore, the only cooling for the wall 45 made of such an alloy is that provided by the normal air supply to the combustor.

In Figs. 6 and 7, there are shown modified heat-resistant walls 45a and 45b for the ignition zone, the wall 45a being of the water cooled jacketed type and the wall 45b of the refractory lined type.

Below the ignition zone, the combustion chamber wall is preferably comprised by a wall construction 46 of stepped formation including annular portions 47 of progressively increasing diameter joined together and to the upstream and downstream sections by means including radial portions 48 each provided with a circumferential series of axially-extending small openings 49 through which cooling air from the jacket space 30 passes and issues interiorly of the combustion chamber along the wall structure to effectively cool the latter and to prevent contact of combustion gases therewith.

The combustor may be either of the straight-through type or it may discharge at right angles to its axis, as illustrated in Fig. 2. Furthermore, as shown in Fig. 2, it is possible to change the direction of the combustion products through an angle of about 180 degrees, this change being made possible by means of deflecting metallic structure 51 surrounding the nozzle 41 and serving to guide the cooled products of combustion and air as an annular stream for discharge through the openings 38. A baffle or deflector 52 constrains the motive fluid issuing from the openings to flow upwardly in entering the turbine supply passage 40. Such change in direction given to the products of combustion as they leave the combustor provides for separation of solid particles by virtue of their velocity energy, the particles being projected straight downstream to a suitable trap, the latter preferably being comprised by a water bath 53 arranged in the ash pit. Not only does the water of this arrangement insure the retention of particles, such as slag or coke, but any water vaporized from the pit will pass off as steam in the motive fluid and will not lower the efficiency of the combustor for any given outlet temperature. The water supplied to the pit may be controlled by any suitable liquid level means.

From the foregoing, it will be apparent that I have provided a combustor capable of burning finely pulverized solid fuel to produce motive fluid suitable for turbine operation and in which the solid non-combustible particles are fine enough to behave in accordance with the laws of gas flow without precipitation as slag or ash, this result being assured by distributed admission of fuel and air for thorough intermingling and zoned combustion, it being important to burn off the volatile component as rapidly as practicable to avoid a long flame and prolonged burning either in a sufficiently long combustor or motive fluid space of the piping or turbine. Because of the high ignition temperature of the non-volatile component of the fuel, the fuel and air are supplied so as to secure combustion and quenching in zones. Fuel is supplied with sufficient air to burn off the volatile component in the ignition zone and to support combustion of the non-volatile component to the extent required for delivery from the ignition to the combustion zone of non-volatile component preheated sufficiently to maintain ignition in the latter zone. Radiant heat from the combustion zone acts on the fuel entering the ignition to effect rapid vaporization of the volatile component not only to maintain ignition and rapid combustion of the vaporized component but to provide for ignition and burning of the non-volatile component to preheat the latter. The fuel-in-air mixture is supplied to the ignition zone at a high enough velocity to avoid "flash-back" over the normal load range. The preheated non-volatile fuel component entering the combustion zone meets with sufficient air for complete combustion at a high enough temperature for rapid combustion so that the non-volatile component may be completely burned within a limited distance of travel along the combustor. Hot products of combustion and excess air flow from the second or non-volatile combustion zone to the third, or quenching, zone to which air is supplied by nozzles arranged to secure uniform mixture thereof with the hot products of combustion and air to secure the desired cooling over a limited distance of travel along the combustor.

By having the fuel and air enter the combustor radially, the entering velocities do not involve the components lengthwise of the combustor, velocities along the latter depending entirely upon volumetric input rates and temperature conditions therealong. Therefore, the time of travel of the first zone is adequate for fuel and air mixing and for ignition, vaporization and combustion of the volatile component. Both the air input to the second zone and the temperature conditions prevailing therein contribute to a higher velocity in the second zone, the volume of air supplied to the latter being about twice that supplied to the first zone; however, the excess of such air to the second zone is kept at a low or nominal amount to provide for a high second zone temperature to enable combustion to take place rapidly and, therefore, over a limited length of travel of the combustor. Furthermore, the radially-entering air for the non-volatile component combustion and quenching zones is preferably supplied, for each zone, by means of long and short nozzles, the long nozzles penetrating the interior of the combustor so as to supply air radially within the combustor stream and to supply air adjacent to the wall. Also, air nozzles of the non-volatile component combustion and quenching zones are preferably inclined upstream to produce a slight counterflow of hot products to aid in providing the heating required in the ignition or volatile fuel component combustion zone and to provide for mixing of the cool air with hot products of combustion and air to secure a more uniform temperature condition transversely of the combustor.

Wherever overheating of the combustor wall is likely to occur, for example, the portion thereof bounding the combustion zone for the non-volatile component, such wall is protected by means of passages arranged to discharge air downstream along the interior wall surface.

While the invention has been shown in several forms, it will be obvious to those skilled in the art that it is not so limited, but is susceptible of various other changes and modifications without departing from the spirit thereof.

What is claimed is:

1. In apparatus utilizing pulverized solid fuel and air to effect combustion to produce motive fluid mixture of products of combustion and air suitable for turbine operation, an elongated combustor closed at its upstream end and provided with a motive fluid mixture outlet at its downstream end, a first circumferential group of nozzles for feeding fuel and air into the upstream end of the combustor substantially radially of the latter with the inlet velocities of the fuel and air used to mix the latter; a second circumferential group of nozzles for supplying air into the combustor substantially radially of the latter; third nozzles for supplying air to the combustor and including a third circumferential group arranged to discharge air into the combustor substantially radially of the latter; said second group of nozzles being spaced downstream along the combustor from the first group so that the portion of the combustor between the groups bounds a first zone for vaporization, ignition, and burning of the volatile component of the fuel and for combustion of the non-volatile component to preheat the latter at least to its ignition temperature and said third group of nozzles being spaced downstream along the combustor from the second group and upstream along the combustor from said outlet so that the portion of the combustor between the second and third nozzle groups bounds a second zone for combustion of the non-volatile component of the fuel and the portion thereof between the third group and the outlet bounds a third zone for reduction in temperature of the hot products of combustion and excess air entering thereinto from the second zone; continuity of the first and second zones providing for heat radiating from the non-volatile fuel component undergoing combustion in the second zone being applied to solid fuel particles in the first zone to assist in vaporizing, igniting and burning the volatile component thereof and in preheating the nonvolatile component; and means providing for air being supplied by the first, second and third nozzle groups so that the air supplied by the first group exceeds that required for complete combustion of the volatile component in the first zone to provide a combustion temperature normally higher than the minimum ignition temperature of such component to assure, under variable conditions and within the length of the first zone, of complete vaporization and combustion of the volatile component and of preheating the non-volatile component to the extent required for maintenance of ignition in the second zone, so that the air supplied by the second nozzle group nominally exceeds that required for complete combustion of the non-volatile component with the excess minimized to insure a maximum combustion temperature to minimize the complete combustion reaction time and consequently the length of flame within the second zone, and so that the air supplied by the third nozzle group is sufficient to reduce the temperature of hot products of combustion and excess air entering the third zone from the second zone to produce motive fluid mixture of desired temperature for turbine operation.

2. Apparatus as claimed in claim 1 wherein the fuel nozzles and the air nozzles of the first circumferential group include a circumferential series of fuel nozzles and a circumferential series of air nozzles disposed respectively circumferentially adjacent to the fuel nozzles to promote immediate mixing of fuel and air entering the first zone.

3. Apparatus as claimed in claim 1 wherein the air nozzles of the first circumferential group include a circumferential series of fuel nozzles and a circumferential series of air nozzles coaxial with the respective fuel nozzles.

4. Apparatus as claimed in claim 1 wherein the nozzles of the second circumferential group include nozzles directed slightly upstream of the combustor.

5. Apparatus as claimed in claim 1 wherein the nozzles of the second and third circumferential groups each include nozzles directed slightly upstream of the combustor.

6. Apparatus as claimed in claim 2 wherein the second and third circumferential groups of nozzles each include a circumferential row of nozzles provided by tubes extending through the combustor wall and having their inner ends spaced radially inward from the interior of the latter and an adjacent circumferential row of nozzles formed by openings in the combustor wall so as to discharge substantially at the interior of the latter.

7. Apparatus as claimed in claim 2 wherein the second and third circumferential groups of nozzles each include a circumferential row of nozzles provided by tubes extending through the combustor wall and an adjacent circumferential row of nozzles provided by openings formed in the combustor wall with the inner ends of the nozzle tubes spaced radially inward from the interior of the combustor wall and the inner ends of the nozzle openings located at the interior of such wall with the nozzle openings of the second circumferential group spaced downstream from the nozzle tubes thereof and with the nozzle openings of the third circumferential group spaced upstream from the nozzle tubes thereof.

8. Apparatus as claimed in claim 1 wherein the second and third circumferential groups of nozzles each include a circumferential row of nozzles provided by tubes extending through the combustor wall and an adjacent circumferential row of nozzles provided by openings formed in the combustor wall with the inner ends of the nozzle tubes spaced radially inward from the interior of the combustor wall and with the inner ends of the nozzle openings at the interior of the latter and with the nozzle tubes of the first circumferential group inclined slightly upstream of the combustor.

9. Apparatus as claimed in claim 1 wherein the second and third circumferential groups of nozzles each include a circumferential row of nozzles provided by tubes extending through the combustor wall and an adjacent circumferential row of nozzles provided by openings formed in the combustor wall with the inner ends of the nozzle tubes spaced radially inward from the interior of the combustor wall and with the inner ends of the nozzle openings at the interior of the latter and with the nozzle tubes of both the second and third circumferential groups inclined slightly upstream of the combustor.

10. In apparatus utilizing finely pulverized solid fuel and air to effect combustion to produce motive fluid mixture of products of combustion and air suitable for turbine operation, an elongated combustor closed at its upstream end and provided with a motive fluid mixture outlet at its downstream end; said combustor including upstream, intermediate, and downstream sections; said intermediate section being of stepped formation and comprising a series of cylindrical portions of successively larger diameter in a downstream direction and means including annular portions connecting the cylindrical portions together and to adjacent ends of the upstream and downstream sections; a first circumferential group of nozzles for feeding fuel and air into the upstream end of the combustor substantially radially of the latter with the inlet velocities of fuel and air used to mix the latter; a second circumferential group of nozzles for discharging air substantially radially into the combustor at or near the junction region of the upstream and intermediate sections; third nozzles including a third circumferential group of nozzles arranged to discharge air radially into the combustor at or near the junction region of the intermediate and downstream sections; said annular portions each having a circumferential series of passages arranged to discharge air along the interior surfaces of the cylindrical portions in a downstream direction; means for supplying finely divided fuel to the fuel nozzles; and means for supplying air to said passages and to the circumferential groups of air nozzles and including a jacket space communicating with said passages and air nozzles.

11. In apparatus utilizing finely pulverized solid fuel and air to effect combustion to produce a mixture of products of combustion and air for gas turbine operation, a vertical elongated combustor closed at its upper end and provided with a motive fluid mixture outlet at its lower end; said combustor including upper, intermediate, and lower sections; said intermediate section being of stepped formation and comprising a series of cylindrical portions of successively larger diameter in a downward direction and means including annular portions connecting the cylindrical portions together and to the adjacent ends of the upper and lower sections; a first circumferential group of nozzles for discharging fuel and air substantially radially into the upper section of the combustor near the upper end thereof; a second circumferential group of nozzles for discharging air substantially radially into the combustor at or near the junction region of the upper and intermediate sections; a third circumferential group of nozzles for discharging air substantially radially into the combustor at or near the junction region of the intermediate and lower sections; a nozzle disposed axially of the lower section and arranged to discharge air upwardly; said upwardly-directed nozzle having its discharge arranged below the third circumferential group of nozzles and above said outlet; a deflector encompassing the upwardly-directed nozzle and cooperating with the lower section to define an annular flow passage; said annular portions each having a circumferential series of passages arranged to discharge air along the interior surfaces of the cylindrical portions in a downward direction; means for supplying finely divided fuel to the fuel nozzles; means for supplying air to said passages and to said circumferential groups of air nozzles and including a jacket space communicating with said passages and with the air nozzles; means for supplying air to the upwardly-directed nozzle; and means including said combustor outlet to provide for change in direction of motive fluid mixture flowing along said annular passage and approaching the outlet so that velocity energy of solid particles is effective to separate the latter from the mixture.

12. In combustion apparatus utilizing finely-pulverized solid fuel and air to produce a motive fluid mixture of products of combustion and air, an elongated combustor, a circumferential group of radially-arranged fuel and air nozzles at the upstream end of the combustor, said fuel and air nozzles being respectively circumferentially adjacent, and means for admitting additional air to the combustor and spaced downstream from the nozzles to define, upstream of such means, an ignition zone, said air nozzles and said air admission means providing for proportioning of the air supplied to the combustor so that the air supplied by the air nozzles suffices to support combustion of the volatile fuel component and combustion of the non-volatile component to provide for the latter issuing from the ignition zone being preheated sufficiently to maintain ignition for combustion supported by air supplied by such admission means and so that the air supplied by said admission means is sufficient for combustion of the non-volatile component and dilution of the products of combustion to provide a motive fluid mixture, said admission means comprising radially-arranged nozzles slightly inclined upstream of the combustor.

13. In combustion apparatus utilizing finely-pulverized solid fuel and air to produce a motive fluid mixture of products of combustion and air, an elongated combustor, a circumferential group of radially-arranged fuel and air nozzles at the upstream end of the combustor, said fuel and air nozzles being respectively circumferentially adjacent, and means for admitting additional air to the combustor and spaced downstream from the nozzles to define, upstream of such means, an ignition zone, said air nozzles and said air admission means providing for proportioning of the air supplied to the combustor so that the air supplied by the air nozzles suffices to support combustion of the volatile fuel component and combustion of the non-volatile component to provide for the latter issuing from the ignition zone being preheated sufficiently to maintain ignition for combustion supported by air supplied by such admission means and so that the air supplied by said admission means is sufficient for combustion of the non-volatile component and dilution of the products of combustion to provide a motive fluid mixture, said air admission means including passages for supplying air for flow along the inner surface of the combustor to protect the latter against overheating.

FLOYD T. HAGUE.

REFERENCES CITED

The following references are of record in the file of this patent:

UNITED STATES PATENTS

| Number | Name | Date |
|---|---|---|
| 1,163,650 | Fogler | Dec. 14, 1915 |
| 1,308,732 | Code | July 1, 1919 |
| 1,390,715 | Horiuchi | Sept. 13, 1921 |
| 1,657,698 | Schutz | Jan. 31, 1928 |
| 1,863,391 | Bluemel | June 14, 1932 |
| 2,268,464 | Seippel | Dec. 30, 1941 |
| 2,332,866 | Müller | Oct. 26, 1943 |
| 2,398,654 | Lubbock | Apr. 16, 1946 |

FOREIGN PATENTS

| Number | Country | Date |
|---|---|---|
| 588,086 | Great Britain | Mar. 30, 1944 |